Feb. 2, 1926.     1,571,423
J. G. MACLAREN
CARRIER DISTRIBUTING APPARATUS FOR PNEUMATIC DISPATCH SYSTEMS
Filed Feb. 24, 1921
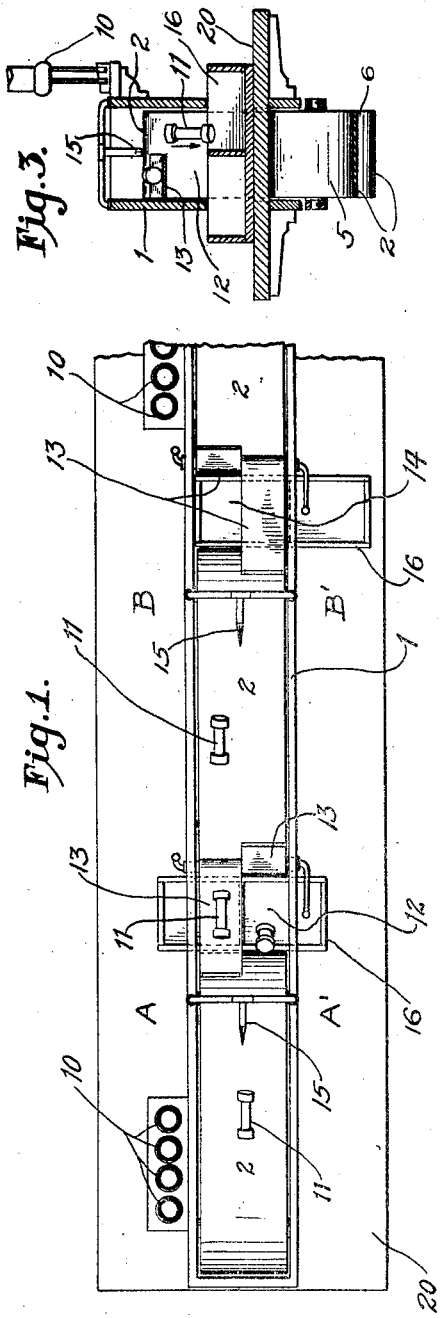
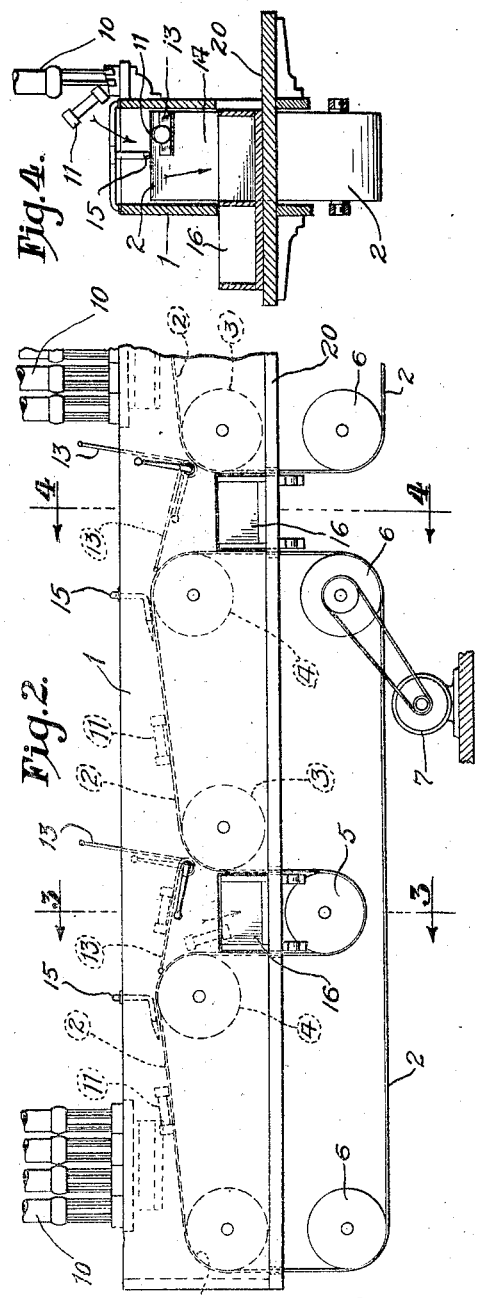
Inventor
JAMES G. MACLAREN
By his Attorney Patented Feb. 2, 1926.

1,571,423

UNITED STATES PATENT OFFICE.

JAMES G. MACLAREN, OF MAMARONECK, NEW YORK, ASSIGNOR, BY MESNE ASSIGNMENTS, TO THE LAMSON COMPANY, A CORPORATION OF MASSACHUSETTS.

CARRIER-DISTRIBUTING APPARATUS FOR PNEUMATIC-DISPATCH SYSTEMS.

Application filed February 24, 1921. Serial No. 447,463.

*To all whom it may concern:*

Be it known that I, JAMES G. MACLAREN, a citizen of the United States, residing at Mamaroneck, in the county of Westchester and State of New York, have invented certain new and useful Improvements in Carrier-Distributing Apparatus for Pneumatic-Dispatch Systems, of which the following is a specification.

This invention relates to carrier distributing apparatus for penumatic dispatch systems.

In the more recent installations of such apparatus it has become the practice to make use of belt conveyors for distributing carriers received from the incoming tubes to the various individuals of various groups of operators stationed along one or both sides of the belt. In order to permit the carriers conveyed by the belt to be handled by less than the full quota of operators, known means in the form of gates have been provided which are placed in obstructing position across the belt for deflecting carriers from the belt at one or more or any desired number of operators' stations less than the whole number available.

It has been found that the use of means for deflecting carriers from the belt is open to the objection that even when placed at a relatively acute angle with the belt, the deflecting gate does not invariably accomplish the desired purpose, with the result that frequently carriers would roll on the belt in contact with the deflecting member, instead of being deflected therefrom as intended. Attempts have been made to overcome this objection by increasing the speed of travel of the conveyor belts, but this has given rise to the equally serious objection of having the carriers deflected from the belt with such force as to make it very difficult to control them.

In the present invention the objectionable features referred to are wholly overcome by avoiding altogether the deflecting of carriers from a belt while, nevertheless, effecting a distribution of carriers at any number of stations less than the whole number served by the common conveyor. I achieve this by making use of a series of belts arranged in tandem, or of a single belt having a series of relatively short stretches so arranged that in normal operation each belt or stretch of belt drops carriers from its delivery end into a gap between the delivery end of the belt and the opposite end of the next adjacent belt or belt stretch and into the receiving hopper or receptacle of an operator's station. Since by this arrangement each belt or belt stretch operates normally to discharge its carriers at the station or stations located at the delivery end of the belt, special means are provided for causing carriers to be conveyed across the gap at the delivery end of a belt and transferred to the next adjacent belt stretch when desired. The special means employed takes the form of a plate or slide which can be placed in bridging relation to the gap at the will of the operator, and which functions to convey carriers from the discharge end of one belt to the opposite end of the next adjacent belt and to thereby prevent the delivery of carriers at the corresponding station.

Other features of the invention include the use of guide means placed at the delivery end of each belt for causing the carriers to present themselves in an endwise relation for delivery at one or other side of the belt in order to facilitate their distribution to one or the other of two stations located opposite each other on opposite sides of the belt. Another feature consists in the provision of a receiving receptacle having two compartments and so constructed as to be placed beneath the gap between adjacent belts and moved laterally therein to receive carriers in one or other or both compartments to thereby receive all or approximately one-half the carriers delivered at any given belt end in either compartment, for attention by the operator at either or both of the corresponding oppositely disposed stations.

In the drawing, in which a preferred form of the invention is selected for illustration, Figure 1 is a plan view of an apparatus embodying my invention.

Figure 2 is a side elevation of the apparatus shown in Figure 1.

Figure 3 is a vertical section of the device taken along the line 3—3 of Figure 2.

Figure 4 is a view similar to Figure 3 and taken along the line 4—4 of Figure 2.

Referring to the drawings for a more detailed description of the invention, a box-like casing or framework 1 is shown in which any desired number of belt stretches 2 arranged in an endwise extending or tandem arrangement may be mounted for operation. The belt stretches 2 may each form the uppermost surface of a single belt operating between the individual sets of pulleys 3 and 4, or two or more stretches 2 may form sections of the same belt which, in order to form separating gaps between the adjacent ends of adjoining stretches, may be passed under guide pulleys 5 placed at suitable intervals to mark the location of a pair of operators' stations placed in oppositely disposed relation on opposite sides of the belt system. When a single belt common to a plurality of stretches 2 is employed, it may conveniently be also passed around guide pulleys 6 placed at the opposite ends of the entire series of belt stretches, one of the pulleys 6 being driven from any suitable means as by a motor 7 such as is shown in Figure 2.

A set of incoming pneumatic dispatch tubes 10 may have the discharge ends thereof arranged to deliver carriers 11 onto the first stretch 2 of the series, the conveying belt or belts then acting to transport the carriers along the length of the casing 1 and to discharge carriers at various stations along the way. In a preferred form of the invention groups of tubes 10 are stationed at and discharge onto every second or third belt stretch thereby to simplify and expedite operations by reducing the number of stations to be served by any given group of tubes.

It will be seen that gaps 12 and 14 are provided between the adjacent ends of adjoining belt stretches 2 and that each belt stretch will normally operate to drop the carriers conveyed thereby into the gap located at the delivery end thereof. Under certain moderate conditions of operation all the carriers delivered by the set of incoming tubes 10 may be handled by the operators at stations A and A' and when this condition exists all the carriers borne by the first belt stretch 2 are permitted to be dropped into the gap 12 between the stations A and A'. However, an increase in the number of carriers delivered by the tubes 10 may make it desirable to transmit all the carriers delivered by the tubes 10 for a time to a set of emergency or reserve stations B and B' located at the end of the second belt stretch 2. To accomplish this a pair of hinged slides or bridging members 13 is so mounted on the sides of the casing 1 that the slides can be swung down from a normally raised position into a position to bridge the gap 12 and thereby cause the carriers delivered by the stretch 2 to the left to be carried across the gap 12 and delivered onto the belt stretch 2 to the right, the latter belt acting to discharge the carriers into the gap 14 between the stations B and B'.

The delivery of carriers at the reserve stations B and B' having relieved the load at stations A and A' and given the operators at the latter stations an opportunity to handle additional carriers one or other of the bridging members 13 at the gap 12 may be raised to permit a portion, approximating one half, of the carriers conveyed by the left-hand belt stretch 2 to be delivered into the gap 12, the remaining portion continuing to be delivered across the bridging member which remains lowered to be discharged at the stations B and B'. It will thus be seen that by bridging all or a portion of any gap in the belt system that a portion or all of the carriers that would normally be delivered at a given station, can be conveyed in whole or part to any other station to the right of the given station.

In order to facilitate the division of the carriers into two groups, a guide or separator 15 is mounted on the casing 1 at the delivery end of each belt stretch. The guide member 15 has the formation of a pointed finger which extends along the surface of the belt in confronting relation to the advancing carriers and in a mid position with relation to the width of the belt, thus dividing the moving carriers into two separate groups.

To accomplish a still further distribution of carriers, special receiving receptacles 16 are provided at each set of stations. The receptacles 16 are formed with two compartments and are movable laterally with relation to the casing 1 in the gap 12 or 14. It will be seen that the lateral position of the receptacle 16 in the gap determines which compartment thereof is to receive all the carriers dropping into the gap and thereby supply either of the oppositely disposed stations with all the carriers. In order to supply each of the oppositely disposed stations with approximately one half the carriers dropping into the gap, the bridging members 13 being raised, the receptacle 16 is placed in a mid position in the stream of carriers so that the partition separating the compartments lies midway in the gap as indicated in Figure 3. The compartments of the receptacle 16 are not intended to serve as storage receptacles for more than a very small number of carriers and are accordingly not designed to preserve the received carriers in any particular order. The closely divided distribution described is effective to deliver carriers at any given station with the same frequency with which the operator can remove them, make change at the table 20, and redispatch the carriers by way of any suitable dispatching means, not shown, to the customer's station.

What I claim is:

1. A conveyor system comprising means for moving articles along a path of substantial width, said path having a gap at a predetermined point, into which such articles may fall, means for dividing articles moving along said path into laterally separated groups, and independent members adapted respectively to bridge opposite lateral portions of the gap whereby to convey the corresponding group of articles across the gap.

2. A conveyor system comprising a moving belt conveyor, means for delivering articles to said conveyor, means near the terminus of the conveyor for dividing the articles moving with the conveyor into laterally separated groups, a plurality of individually operable controllers disposed at the terminus of the conveyor and corresponding in number to the number of groups into which the articles are separated, and means for swinging each controller from one position to another, each controller when in one position forming in effect a continuation of the conveyor to receive articles from the terminus of the latter, and when in another position permitting articles of the corresponding group to drop freely from the terminus of the conveyor.

3. A conveyor system comprising a plurality of aligned conveyor runs, the terminus of each run being separated from the adjacent end of the following run by a gap, a separator member adjacent to the terminus of each run for dividing material carried by said conveyor run into laterally separated portions, a pair of bridge members hinged at the remote side of each gap, the free edge of each bridge member, when in operative position, substantially engaging the terminus of the preceding conveyor run whereby in effect to form a continuation of the latter and thereby to transmit the corresponding portion of said material from said terminus to the next succeeding run, and means for moving said bridge members independently of one another from the aforesaid position to one in which they leave the gap open for the reception of material delivered from the terminus of the conveyor run.

4. In a conveyor system, a plurality of conveyor belt stretches arranged in longitudinal series with the successive belt stretches of the series spaced apart to form a pair of flanking delivery stations at the discharge end of each stretch, and means movable into position to bridge a portion of the gap between adjacent stretches thereby to cause a portion of the articles to be delivered to the next belt stretch in advance and to permit a portion of the articles to be delivered at either of the stations adjacent to the gap.

5. In a conveyor system, a plurality of conveyor belt stretches arranged in longitudinal series with the successive belt stretches of the series spaced at the discharge end of each stretch, a station at each side of the belt stretch at each discharge position, and means movable into position to bridge the whole or a portion of the gap between adjacent stretches thereby to cause all or a portion of the articles to be delivered to the next belt stretch in advance instead of to one or both of the stations adjacent to the gap or to cause a portion of the articles to be delivered at a station at either side of the gap.

6. A conveyor system comprising a moving conveyor, means for delivering articles to the conveyor, means near the terminus of said conveyor for segregating articles carried thereby into distant groups, means actuable selectively to permit or to prevent delivery of one or more of said groups of articles at the terminus of the conveyor, and a receptacle movable transversely of the direction of movement of the conveyor and positioned to receive articles delivered at the terminus of the conveyor, said receptacle having a plurality of separated compartments.

7. In a conveyor system, a conveyor belt stretch, means adjacent to the delivery end of said stretch for dividing the conveyed articles into a plurality of laterally separate groups, operators' stations located at opposite sides of the belt stretch, means for selectively delivering or preventing the delivery of one or both groups of articles at the delivery end of the stretch, a receptacle stationed at the end of the stretch and movable laterally with relation to the axis of the stretch, said receptacle being provided with two compartments corresponding to the oppositely disposed stations, the lateral disposition of said receptacle serving selectively to assign a portion or all of the delivered articles to either of said compartments for the corresponding station.

8. In a conveyor system, a plurality of conveyor belt stretches arranged in longitudinal series with the successive belt stretches of the series spaced apart to form a delivery station at the discharge end of each stretch, means movable into position to bridge a portion of the gap between adjacent stretches thereby to permit a portion only of the conveyed articles to be delivered at the station adjacent to the gap, operators' stations located at opposite sides of the belt stretch, a receptacle stationed in the gap and movable laterally with relation to the axis of the belt stretch, said receptacle being provided with two compartments corresponding to the oppositely disposed stations, the lateral disposition of said receptacles serving selectively to assign a portion or all of the delivered articles to either of said compartments for the corresponding station.

JAMES G. MACLAREN.

Certificate of Correction.

It is hereby certified that in Letters Patent No. 1,571,423, granted February 2, 1926, upon the application of James G. Maclaren, of Mamaroneck, New York, for an improvement in "Carrier-Distributing Apparatus for Pneumatic-Dispatch Systems," an error appears in the printed specification requiring correction as follows: Page 3, line 96, claim 6, for the word "distant" read *distinct;* and that the said Letters Patent should be read with this correction therein that the same may conform to the record of the case in the Patent Office.

Signed and sealed this 16th day of March, A. D. 1926.

[SEAL.]
M. J. MOORE,
*Acting Commissioner of Patents.*